United States Patent
Herring et al.

(10) Patent No.: US 8,122,459 B2
(45) Date of Patent: Feb. 21, 2012

(54) ENGINE AGNOSTIC INTERFACE FOR COMMUNICATION BETWEEN GAME ENGINES AND SIMULATIONS SYSTEMS

(75) Inventors: Nicholas Herring, Honolulu, HI (US); Laurent Scallie, Honolulu, HI (US)

(73) Assignee: Atlantis Cyberspace, Inc., Honolulu, HI (US)

( * ) Notice: Subject to any disclaimer, the term of this patent is extended or adjusted under 35 U.S.C. 154(b) by 813 days.

(21) Appl. No.: 12/239,623

(22) Filed: Sep. 26, 2008

(65) Prior Publication Data

US 2010/0083286 A1   Apr. 1, 2010

(51) Int. Cl.
*G06F 3/00* (2006.01)
*A63B 63/00* (2006.01)
(52) U.S. Cl. .................. 719/328; 273/317
(58) Field of Classification Search ............... 719/328; 273/317
See application file for complete search history.

(56) References Cited

U.S. PATENT DOCUMENTS 6,609,968 B1 * 8/2003 Okada et al. ............. 463/1
2008/0108437 A1 * 5/2008 Kaarela et al. ............. 463/42

OTHER PUBLICATIONS

Fawzi Daoud, Strategies for Provisioning and operating VHE Services in Multi-Access Networks, 2002.*

* cited by examiner

*Primary Examiner* — Lechi Truong
(74) *Attorney, Agent, or Firm* — Rosenfeld Law Corp; Mitchell S. Rosenfeld

(57) ABSTRACT

A software architecture is provided that has an agnostic interface mechanism coupled between a simulator and a game engine. The agnostic interface mechanism has an extension interface to translate simulator specific data objects to/from interface objects, a reflector interface to translate interface data objects to/from game specific objects, a launcher interface to translate interface control objects for controlling the game engine into game specific control objects, and a core control coupled between the extension interface and the reflector and launcher interfaces for controlling the communication of objects between the simulator and the game engine. The core control through the reflector and launcher interfaces provides game specific objects to the game engine through direct application programming interface (API) calls.

9 Claims, 4 Drawing Sheets

ENGINE AGNOSTIC INTERFACE FOR COMMUNICATION BETWEEN GAME ENGINES AND SIMULATIONS SYSTEMS

FIELD OF THE INVENTION

The present invention relates generally to simulation systems, and more particularly to an engine agnostic interface for connecting game engines and training simulation systems.

BACKGROUND OF THE INVENTION

The Department of Defense (DoD) has been examining the role of game technology for use with future training systems. Government funded research programs have sponsored the development of commercial software that attempts to bridge simulation protocols and the commercial game market. GameLink, developed by MaK Technologies, creates a network bridge between Epic Unreal Engine game content and HLA or DIS simulations. University of Pittsburg researchers have developed a system which uses multi-agent technology to interconnect otherwise incompatible systems (Unreal Tournament Semi-Automated Force). Overall, the goal to bridge game and simulation technology has been disparate and no API specifications, standards, or software implementations have yet emerged.

Interoperability between simulators is an ongoing and complex problem that most distributed systems must deal with. Certain military protocols have tried to address this problem, most notably at the network level, with such protocols as the Distributed Interactive Simulation (DIS), High Level Architecture (HLA), or Test and Training Enabling Architecture (TENA). Unfortunately a lack of stringent implementation specifications, even with higher level features such as FOM definition and implementation, is only applicable from one developer to another. Additionally, the absence of any standardization has made it difficult to support complex feature sets such as models with many levels of matrix transformations. Furthermore, simulation systems require high network performance to operate with complex data types within a distributed simulation environment. Unfortunately, very complicated data such as skeletal articulations tend to create noticeable latency within a large federated system.

Applicant's U.S. App. Pub. No. US 2002/0082086 A1 ("Mission Control") defines a system where the controlling application communicates with the game engine via a network client and server architecture. The game engine is required to create a network client in order to communicate with the controlling applications network server (i.e., mission control). This mechanism only allows direct calls to be made to the network interface, which limits data structure usage, speed, and has extremely complex maintenance. Moreover, Mission Control utilizes a network protocol defined to communicate control of the game engine. Mission Control assumes that the game engine will connect via Mission Control's network protocol after the game engine's process is started. Mission Control has no method to interact with data of either the game engine or the simulator, in sharp contrast to the present invention. The present invention has a defined interface for the control and data interaction of the game engine, as well as an interface for the data interaction of the simulator. These interfaces of the present invention allow not only control the game engine, but also act as a vehicle for data between game engines and simulators. Since Mission Control only has a control mechanism over a network protocol, Mission Control cannot convey any data from a game engine to a simulator.

Although game technology is starting to gain credence as a valid training tool in the modeling and simulation industry, a generic architecture designed to easily integrate current and future capable systems is yet to be developed. The present invention seeks to solve these problems by providing a mechanism that does not communicate with the game engine through a network protocol and thus allows for a much more flexible, maintainable, and fast method of data extraction and injection.

The following terms are utilized throughout the specification in accordance with the accompanying definitions.

EAI Core: Primary API for which integrators access Modules and Controllers.

Entity Controller: Maintains all registered entity types and Sister Entity types. Creates Sister Entities and Entity Modules as well as updating those references in the Entity Modules.

Entity Controller Module: Primary access for Extensions to interact with entity data. Maintains changes from Extensions and commits those changes to the EAI Core. One Entity Module is needed per Extension.

Interaction Controller: Maintains all registered Interaction types and Sister Interaction types. Creates Sister Interactions and executes those interactions on all relevant Interaction Modules.

Interaction Controller Module: Primary access for Extensions to execute and receive Interactions.

Engine Controller: Primary interface for controlling the integrated game engine.

Extension Controller: Primary interface for instantiating and maintaining Extensions.

Entity: A standard C++ object defined by the EAI Core to contain standard information that represents objects in the game engine from munitions to humans and vehicles. Entities can be interacted with by any system interfacing with an Entity Controller Module.

Sister Entity: A standard C++ object defined by the game engine or Extension to translate information between EAI Core Entities.

Interaction: A standard C++ object defined by the EAI Core to represent any event triggered in the system from either game engines or Extensions. Interactions can be executed and received from any system interfacing with an Interaction Controller Module.

Sister Interaction: A standard C++ object defined by the game engine or Extension to execute or receive EAI Core Interactions.

Controlling Application: Any application that uses the EAI Core on the API level, or instantiates the EAI Core DLL.

Extension: Any applications integrated with the Extension Controller, Entity Controller Module, and Interaction Controller Module that listen, inject, or modify Entities or Interactions within the EAI Core.

Launcher: An interface that is implemented within the game engine to allow the Engine Controller to launch and maintain an instance of that game engine.

Reflector: An interface that is implemented within the game engine to allow the Entity Controller and Interaction Controller to interact with the game engines Sister Entities and Interactions.

SUMMARY OF THE INVENTION

In today's environment, system incompatibility issues often create complex maintenance problems. This, coupled with the difficulty to interoperate with new and emerging standards, usually causes the integrator to either work with outdated software code or ultimately to build new systems, entirely from scratch, with no reusability of previous development. The present invention redefines ways of creating and sustaining complex system of systems architectures used in most advanced simulation systems.

Many simulation companies fail to keep up with evolving technology, and consequently have trouble sustaining new standards and protocols. The present invention provides architecture designed with future capabilities in mind without having any implementation knowledge. Additionally, the architecture is backward compatible to support earlier design decisions and completely interoperable with other similarly-based systems.

Almost all simulations systems use custom hardware solutions such as input/output devices, network and communication systems, multi-modal feedback devices, and rendering displays (audio, visual). The present invention supports any number of devices using a layer of abstraction between the particular hardware system and the software. Additionally, new devices are able to send, receive, or present data in a standardized way.

Interoperability between simulators is an ongoing and complex problem that most distributed systems must deal with. Certain military protocols have tried to address this problem, most notably at the network level, with such protocols as the Distributed Interactive Simulation (DIS), High Level Architecture (HLA), or Test and Training Enabling Architecture (TENA). Unfortunately a lack of stringent implementation specifications, even with higher level features such as FOM definition and implementation, is only applicable from one developer to another. Additionally, the absence of any standardization has made it difficult to support complex feature sets such as models with many levels of matrix transformations. Furthermore, simulation systems require high network performance to operate with complex data types within a distributed simulation environment. Unfortunately, very complicated data such as skeletal articulations tend to create noticeable latency within a large federated system. The present invention provides an architecture that manages low latency transmittal of complex data types within the network which is vital for supporting advanced modeling in a simulated environment.

One aspect of the present invention is to provide a collection of interfaces whose purpose is to mediate data and events between controlling applications and video game engines. Its overall design has several goals in mind:

It is, first and foremost, a bridge between game technologies and military training systems.

It is designed as an abstract supporting interface which provides generic data exposure and access to other components through generic interfaces.

It is a future capable system where new components can be upgraded with little time investment and no detriment to the overall system.

It is a compliance-based system where any component that is EAI compliant is automatically compliant with all other compliant EAI components.

In another aspect of the present invention, a flexible and rapid representation of any training scenario is provided by use of a multi-layered architecture consisting of abstract extensible interfaces. This design provides a platform-independent reconfigurable model where any component can be removed, augmented, or replaced with no detriment to the system. Additionally, any Module can provide real-time feedback into the system so other Modules may easily adapt to the new state of the simulation architecture.

The aspects of the present invention are carried out in one embodiment by a system and corresponding method for communicating between a simulator and a game engine having an agnostic interface mechanism coupled between the simulator and the game engine. The elements of the system may be a computer program product comprising a computer usable medium having control logic stored therein.

The agnostic interface mechanism has an extension interface configured to receive a simulator specific object from the simulator via a specific protocol of the simulator and to translate the simulator specific object into a interface object; a reflector interface configured to translate the interface object into a game specific object and to transmit the game specific object to the game engine, and a core control (made up of controllers and controller modules) coupled between the extension interface and the reflector interface for controlling the communication of objects between the simulator and the game engine. The core control through the reflector interface provides the first game specific object to the game engine through a direct application programming interface (API) call.

The reflector interface is also configured to translate a game specific object generated by the game engine into an interface object, and the extension interface is also configured to translate the second interface object into a simulator specific object in accordance with the simulator specific protocol and to provide the simulator specific object to the simulator.

The corresponding objects being originated by and being communicated between the simulator and the game engine are data objects. In addition, control objects are generated by the core control for maintaining multiple instances of the game engine. The controls include creating, starting, stopping and destroying game engines. The control objects are translated from interface objects into game specific objects and transmitted to the game engine by a launcher interface.

Other objects and advantages, which are set forth in the description of the Detailed Description. The features and advantages described in the specification, however, are not all inclusive, and particularly, many additional features and advantages will be apparent to one of ordinary skill in the art in view of the drawings and specification herein.

DETAILED DESCRIPTION

Overview

The engine agnostic interface (EAI) 10 of the preferred embodiment is a software architecture utilizing an abstract engine application programming interface (API) that exposes only necessary components of EAI 10. EAI 10 interfaces between Simulator 24, such as military training simulator, and Game Engine 26.

Figure 1:
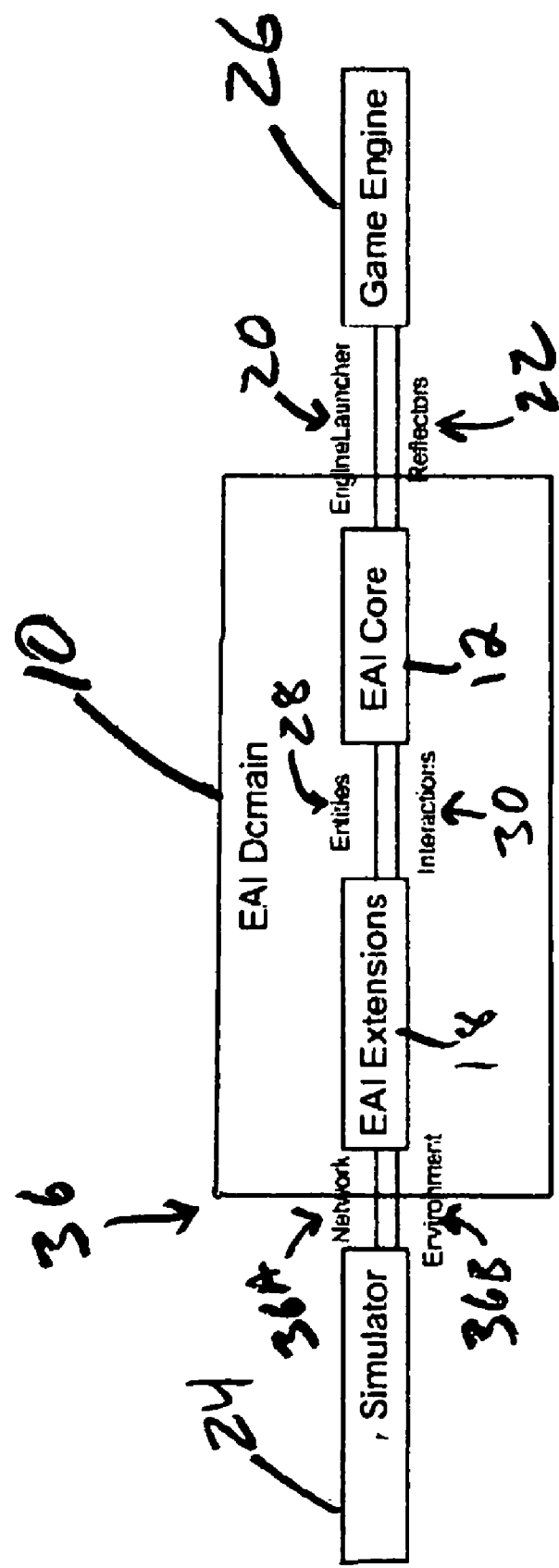
FIG. 1 is a functional block diagram of the domain of the preferred embodiment of the present invention relative to the game engine and training simulation system.
Figure 2:
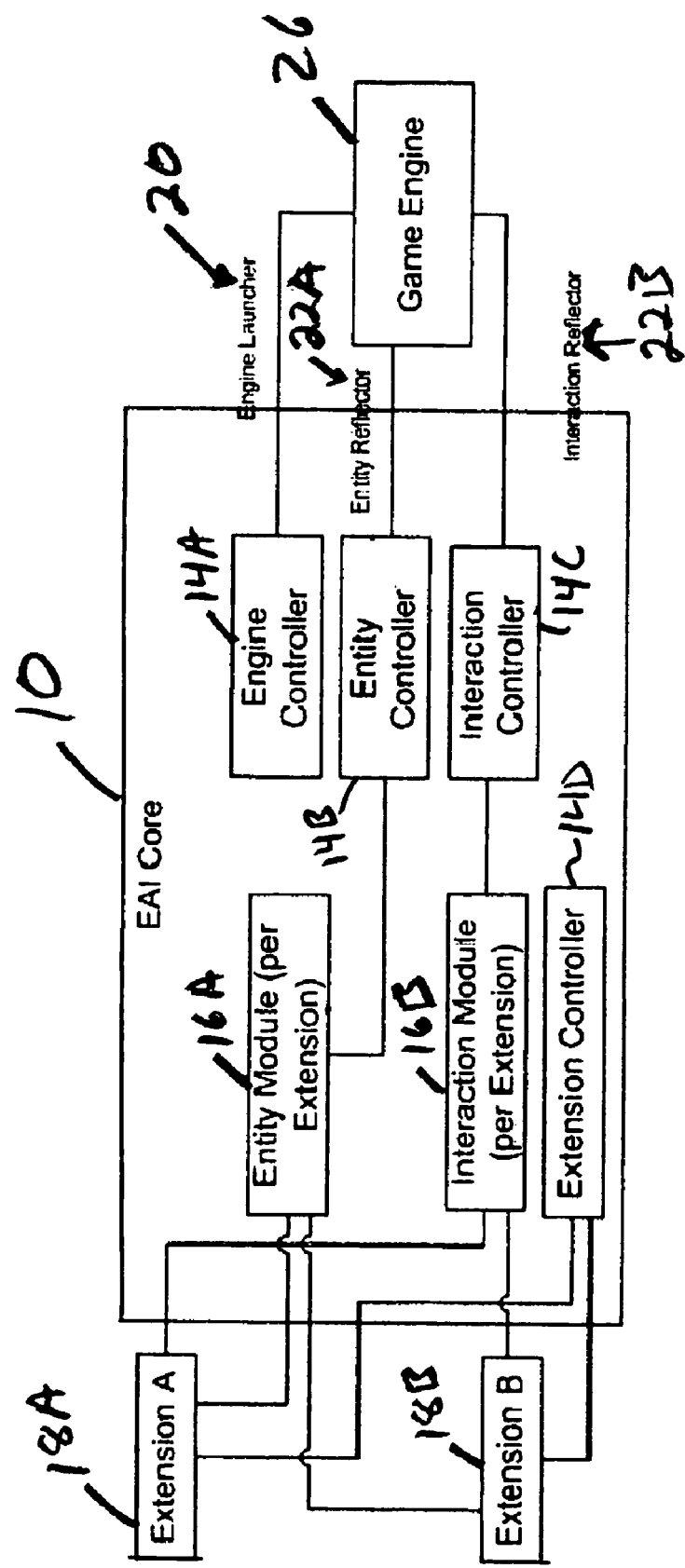
FIG. 2 is a functional block diagram of the EAI Core depicted in FIG. 1.

As depicted in FIGS. 1 and 2, the components of EAI 10 are EAI Core 12 (which is comprised of Controllers 14 and Modules 16), Extensions 18, Launchers 20, and Reflectors 22. Controllers 14 include Engine Controller 14A, Entity Controller 14B, Interaction Controller 14C and Extension Controller 14D. Modules 16 include Entity Module 16A and Interaction Module 16B. There is one of each type of Module 16 per each Extension 18. Through these components, EAI 10 has enough flexibility to generate a generic modular system that can interoperate with other EAI implementations. Although each controlling application needs its own set of Extensions 16, the final implementation is available for any other EAI-based system.

EAI 10 further includes several data types, Entities 28 and Interactions 30, along with their sisters as explained below with respect to FIG. 3. A data type is an object that represents a specific construct of information.

As shown in FIG. 1, Game Engine 26 is coupled to EAI Core 12 via Engine Launcher 20 and Reflectors 22. This connection represents the EAI's translation from the EAI Core domain into Game Engine 26 domain. The data which is used in this translation is a combination of EAI Core Entities 28 and Interactions 30 with game engine Sister Entities 32 and Sister Interactions 34. EAI Core 12 is coupled to EAI Extensions 18 via EAI Core Entities 28 and Interactions 30 that are available within the EAI domain. EAI Extensions 18, which could represent many different Extensions 18 based on their purpose, is coupled with a Simulator 24 via network and/or environment data in the form of the network and/or environment protocols 36 needed to communicate with a specific Simulator 24. Whether the utilized protocols 36 are network protocols 36A, environment protocols 36B, or both depends on which Extensions 18 are active. Network protocol 36A is simply any protocol for network packets, such as TCP/IP or UDP. Environmental protocol 36B is based on Extension 18 and the specific data needed by Simulator 24.

As shown in FIG. 2, the components of EAI Core 12 are depicted in detail. Game engine 26 is coupled to Engine Controller 14A via Engine Launcher 20. This is the primary integration into Game Engine 26 to provide control of instancing and destroying Game Engine 26, which also represents the boundaries of EAI Core 12 and that the Engine Launcher is implemented within Game Engine 26. This is the primary entry point into Game Engine 26 which provides functions to create and destroy instances of Game Engine 26. This entry point also represents the boundaries of EAI Core 12 and Engine Launcher 20 which is implemented within Game Engine 26.

Game Engine 26 is also coupled to Entity Controller 14B and Interaction Controller 14C through Entity Reflector 22A and Interaction Reflector 22B, respectively. This connection is where EAI Core Entities 28 and Interactions 30 are translated into Game Engine Sister Entities 32 and Sister Interactions 34. This connection also represents the boundaries of EAI Core 12 and Entity Reflector 22A and Interaction Reflector 22B, which are implemented within Game Engine 26. Entity Controller 14B and Interaction Controller 14C are coupled with their respective Modules, Entity Module 16A and Interaction Module 16B. For each Extension 18 that is maintained by EAI Core 12, an Entity Module 16A and Interaction Module 16B must be created. This connection represents the flow of EAI Core Entities 28 and Interactions 30. Entity Module 16A and Interaction Module 16B are coupled with Extension A 18A and Extension B 18B. This represents the access to EAI Core Entities 28 and Interactions 30, which enables Extensions 18 to interact with available Entities 28 and Interactions 30. Extension Controller 14D is also coupled with Extension A 18A and Extension B 18B. This connection represents the management of Extensions 18 to the extent of starting and stopping Extensions 18.

The fundamental building blocks of EAI 10 (Controllers 14, Modules 16, and Extensions 18) provide a framework for bridging the barrier between Game Engine 26 and simulator 24. The overall design provides a platform-independent reconfiguration model where any component can be removed, augmented, or replaced with no detriment to the system. EAI 10 provides unique ways of supporting several concurrent systems and at multiple levels of integration. The benefits of a configurable training, mission rehearsal, mission planning, and battlefield visualization systems are numerous. The layered architecture approach reduces development time and creates a bridging system between various technologies contained within the infrastructure. Additionally, the Extension library and API give the developer added control over building new Extensions 18. The result is a comprehensive training system that can ultimately support an indefinite number of hardware and software components within the simulation.

EAI Core 12 is the primary interface for creating internal components and connecting external components. EAI Core 12 is responsible for executing high level commands within EAI 10 from a controlling application. These commands range from creating Extensions 18 to starting and stopping Game Engines 26. EAI Core 12 acts a hub for all Controllers 14 that interoperate with it and for Extensions 18 that need to be connected to Modules 16.

EAI Core 12 does not communicate with Game Engine 26 through a network protocol; rather it uses direct DLL entry points for communication since Game Engine 26 is instantiated within the same process. The communication of EAI Core 12 through DLL entry points allows Entities 28 and Interactions 30 to be passed back and forth through EAI Core 12 and Game Engine 26. This mechanism allows for a much more flexible, maintainable, and fast method of data extraction and injection.

The domain of EAI 10 lies between Simulators 24 and Game Engines 26. Extensions 18 provide the data that is needed by Simulators 24 in order to facilitate interoperability with EAI integrated systems. Engine Launchers 20 and Reflectors 22 provide the bridge into Game Engine 26 for communication of the basic types of data: Entities 28 and Interactions 30, as shown in FIG. 1.

When integrated with EAI Core 12, Game Engine 26 operates nominally, except that it communicates all Entities and Interactions created in Game Engine 26 or EAI Core 12. These are in turn translated through Extensions 18 managed by EAI Core 12 to Simulator 24.

For example, if the ONESAF military training simulator system is utilized as Simulator 24, the ONESAF simulator would generate an object in its world and that would be sent via a specific protocol to an Extension 18 developed specifically for ONESAF communication. The ONESAF Extension would in turn translate this data into EAI Core Entities 28 and Interactions 30. Once that data is translated, Engine Controller 14A then notifies Game Engine 26 (in this case the Unreal Engine) so that it can properly represent that information. From the opposite side of the data flow, the Unreal Engine could create an object that would then be translated into an EAI Core Entity 28 or Interaction 30 via Reflectors 22. This Entity 28 or Interaction 30 would then be sent to all Extensions 18 through Controller Modules 16. After this update reaches the ONESAF Extension, the ONESAF Extension 18 then translates that data into the required Protocol 36 for the ONESAF simulator.

Controllers

Controller 14 effects some change within EAI 10 by translating information that is available within the simulation. For example, Controller 14 could be an initialization parameter of a display engine or any entity operating within that engine. Controllers 14 are also the data source for Controller Modules 16 as explained in more detail below.

The purpose of Engine Controller 14A is to create compliance and interoperability within the EAI system. Engine Controller 14A supports multiple engine implementations and has the capacity, with additional EAIs, to instantiate multiple engine instances during the running of the simulation. The basic level Engine Controller command starts and stops Game Engine 26 as well as connects Entities 28 and Interactions 30 within Game Engine 26. Engine Controllers 14A are closely tied to Entity Controller 14B and Interaction Controller 14C where they expose the engine data generically to any Modules 16 that need to use it as a data source.

Launchers 20 execute functions invoked by Engine Controller 14A. This includes starting/stopping engines and communicating references to Reflectors and Controllers. Launchers 20 are the update function within any constructive or video game engine connected to EAI 10.

Launcher 20 is an interface provided by EAI Core 12, but not implemented. Each Game Engine 26 will implement a specific Launcher 20 to provide a DLL entry point into the engine instance. This means that the controlling application that runs EAI Core 12 will also have the engine instance within the same process. This is the key mechanism that allows object data in the form of Entities 28 and Interactions 30 to flow freely from Extensions 18 to Game Engine 26 and back.

Reflectors 22 have two main functions: relaying generic entity/interaction data to Controllers 14 from Game Engines 26 and relaying engine specific entity/interaction data to Game Engines 26 from Controllers 14. These functions provide the data that is represented within EAI Controllers 14.

Once Reflectors 22 are implemented by Game Engine 26 and connected through Launcher 20, Entities 28 and Interactions 30 can be sent into EAI Core 12. Reflectors 22 are different from Controller Modules 16 that Extensions 18 interface with due to the mentality that Game Engine 26 is the authority on the objects in EAI Core 12.

Entity Controller 14B is the base controller class for Entities 28 in the simulation. Entity Controller 14B communicates directly with Engine Controller 14A through a Reflector 22 component and Reflector 22 creates an intermediate format used by EAI 10. Any change that happens within Game Engine 26 is recorded by Entity Controller 14B and conversely, any change to Entity Controller 14B is propagated to Game Engine 26.

Extensions 18 and Game Engines 26 access entity data through Entity Controller 14B. Since all data needs to eventually become basic EAI entity types, Sister Entities are created. This design pattern allows each Extension 18 and Game Engine 26 to define an object in their native environment while still maintaining a connection to the basic EAI Entity 28. Sister Entities identify which Entities 18 are targeted for operations within Extensions 18 and Game Engines 26. If there are no Sister Entities defined for a basic EAI Entity 28, then those will be ignored for that respective Extension 18 or Game Engine 26.

Figure 3:
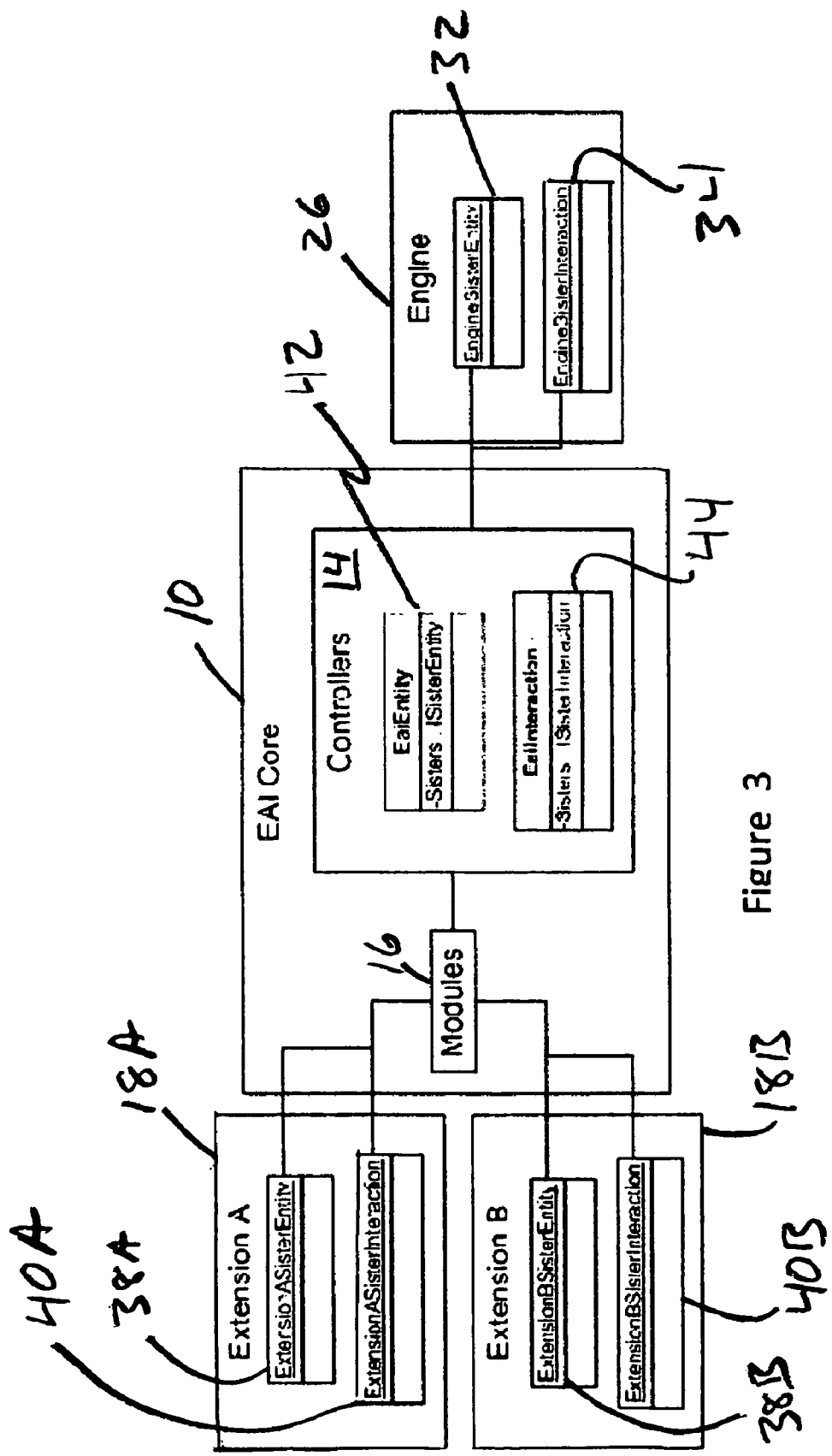
FIG. 3 is a functional block diagram of the Sister Definitions of the preferred embodiment of the present invention.

The relationship between EAI Core 12 and Sister Entities are shown in FIG. 3. EAI Core 12 has registered types of Entities 28 and Interactions 30, represented by the EaiEntity class 42 and EaiInteraction class 44. Game Engines 26 and Extensions 18 define their Sister Entities and Sister Interactions, represented by ExtensionASisterEntity 38A, ExtensionASisterInteraction 40A, ExtensionBSisterEntity 38B, ExtensionASisterInteraction 40B, EngineSisterEntity 32, and EngineSisterInteraction 34. When EAI Core 12 is initialized, all relevant Sister Entities and Sister Interactions are connected to their corresponding EAI Core Entities 28 and Interactions 30. The Sister connection for Game Engine 26 is made through Entity Controller 14B and Interaction Controller 14 C, respectively, and is stored within EAI Core Entities 28 and Interactions 30. The Sister connection for Extensions 18 is made through Entity Controller Module 16A and Interaction Controller Module 16B, respectively. FIG. 3 shows that if an EaiEntity 42 is created, EAI Core 12 will create an ExtensionASisterEntity 38A, ExtensionBSisterEntity 38B, and an EngineSisterEntity 32. Also, if an EaiInteraction 44 is created, EAI Core will create an ExtensionASisterInteraction 40A, ExtensionASisterInteraction 40B, and an EngineSisterInteraction 34.

Similar to the HLA model, any event that occurs in Simulator 24 is defined as an Interaction 30. Any Interaction occurring within Game Engine 26 is recorded by Interaction Controller 14C and any Interaction 30 sent to Interaction Controller 14C is executed within Game Engine 26.

With the same concept as Entity Controller 14B, Interaction Controller 14C also requires Sister Interactions to be defined in each Extension 18 or Game Engine 26 that needs their information.

Extension Controller 14D manages any Extensions 18 which have been loaded into EAI Core 12. Its role is to make sure that each Extension 18 is maintained and has access to all Controllers 14 within EAI Core 12.

Modules

Modules 16 are objects that provide information needed by external Extensions 18 and act as a data protection layer for Controllers 14. Modules 16 also prioritize the execution of Extension operations. Modules 16 are essential to EAI Core 12, Entity Controller 14B, and Interaction Controller 14C. Game Engine 26 is considered to be the authority in EAI Core 12, so Game Engine 26 does not use a Module 16 to send and receive data. Extensions 18 are required to use Modules 16 because of concurrent modification of Entities 28 or potentially identical Interactions 30. Modules 16 protect the data by identifying changes in identical Entities 28 and propagating their delta combination.

Extensions

Extensions 18 are external objects that respond to generic information that are produced by EAI 10. Each Extension 18 communicates with and manipulates data through its exposed Controller Modules 16. Extensions 18 are simple, and only communicate with Controller Modules 16. In contrast, Launchers 20 and Reflectors 22 are exclusive to game engine integration. Extensions 18 also have access to generic data which simplifies hardware and software integration. This generic data powers the capabilities to integrate new hardware and software interfaces while maintaining overall system compatibility. There are many different types of Extensions 18. Exemplary Extensions 18 include a Generic Input Extension, a Session Recorder/Player Extension, and a Statistical Processor Extension.

The Generic Input Extension addresses the problem of generic hardware input device compatibility. This Extension creates a standard interface for directing input and output from various devices. The EAI Generic Hardware Extension operates on the same concepts as DirectInput, by abstracting hardware device inputs such as joysticks and other devices. However, the Generic Input Extension goes further by abstracting more complex inputs such as orientation and rotation data (X, Y, Z or Yaw, Pitch, Roll) from spatial or inertial tracking systems. Furthermore, skeletal structure orientation and movement data is also abstracted by the Generic Input Extension for use with more complex systems like a motion capture system or haptic devices such as gloves or vests.

The Session Recorder/Player Extension collects entity and interaction data within EAI 10 and also has the ability to replay that data as it was observed. This allows an intermediate recording format usable by any Game Engine 26 to interface with EAI 10. EAI 10 should be able to play back any session from any EAI implementation.

Similar to the Session Recorder/Player Extension, the Statistical Processor Extension saves raw statistical data to a remote database real time. Its purpose is to provide real time information to remote systems and rely on the external systems to translate the raw data.

This extension is designed to create a standard protocol for translating HLA/DIS traffic into an internal EAI format. The Network Hub Extension's power is its ability to manage the sending and receiving of network traffic in a federation (HLA/DIS) using an advanced priority scheme, sending only important or relevant information to a federate that subscribes to that information. It is possible, for example, that a federate might subscribe to a particular type of data but not receive it in a brute force manner the way HLA normally sends network updates.

Developers can create EAI Extensions 18 that access generic data in the EAI system. Extensions 18 can be created from the Extension 18 interfaces provided by EAI Core 12. With these interfaces, developers can gain access to Entity Controller Module 16A and Interaction Controller Module 16B allowing them to communicate with all Entity 28 and Interaction 30 activity within EAI Core 12. This allows developers to integrate custom hardware or to support a new Protocol 36.

For application developers, low-level routines written to establish basic communication with EAI 10 are not necessary.

EAI Integration

The primary mechanisms for EAI integration are Entities 28 and Interactions 30. These are the primary currency of Extensions 18 and Game Engine 26 connected to EAI Core 12. Combined with the design pattern of Sister objects (see Entity and Interaction Controller), EAI integration provides a more widely usable infrastructure to expose and inject game engine data.

Preferably, the entirety of EAI Core 12 and Extensions 18 are built in C++. This is preferred because almost all game engine cores are built around the same standards as C++. The main challenge for integration with Game Engines 26 revolves around the restriction of the interfaces of EAI 10. Preferably, all entry points into EAI 10 must not utilize STL (Standard Template Library) data structures. This preference is due to the various implementations and differences of Microsoft's CRT (Common Runtime). For example, EAI 10 is compatible with Game Engines 26 built with Visual Studio 2003 to Visual Studio 2008 because the interfaces of EAI Core 12 (Launchers 20 and Reflectors 22) use basic standard data structures to communicate with Game Engine 26.

Another large challenge of integrating EAI 10 into Game Engines 26 lies within the design choice to maintain all systems within the same logical process. This means that the Controlling Application (i.e., ControlApp.exe) would create an EAI Core 12. After the instantiation of EAI Core 12, Engine Controller 14A would then create and instance of Game Engine 26. This would all show up on the system resources as a single process. (i.e., still ControlApp.exe). This design allows for faster direct integration with Game Engine 26 as opposed to more lengthy or complex interfaces such as memory sharing or network clients and servers. With Controlling Application 104, EAI Core 12, and Game Engine 26 all in the same process, this poses some unique problems.

First, since Game Engine 26 is the largest variable of any EAI integration, the working directory has to be set to that of Game Engine 26. This in turn changes what and where Controlling Application 104 and EAI Core 12 load and search for components such as DLLs. Controlling Application 104, EAI Core 12, and Game Engine 26 need to be modified to make sure that they are aware of their modified working directory.

Second, DLL module management is needed in order to maintain the instances of EAI Core 12 and Game Engine 26 components. EAI Core 12 is designed to be able to create and destroy a Game Engine 26 all within the same process. Most Game Engines 26 are not designed to be created and destroyed from within the same process. Due to this Engine Controller 14A needs to maintain the DLLs loaded by Game Engine 26 and either unload them when Game Engine 26 is destroyed or keep them alive for another instance of Game Engine 26.

Third, since most Game Engines 26 are not designed to be created and destroyed within the same process, there is a need to modify some aspects of Game Engine 26 to accommodate this. These accommodations include operating system handles (i.e., window handles and rendering contexts), global variables that might interfere with two instances of Game Engine 26 running in the same memory space, and any mutex which would be checking for a duplicate instance of specific DLLs.

Figure 4:
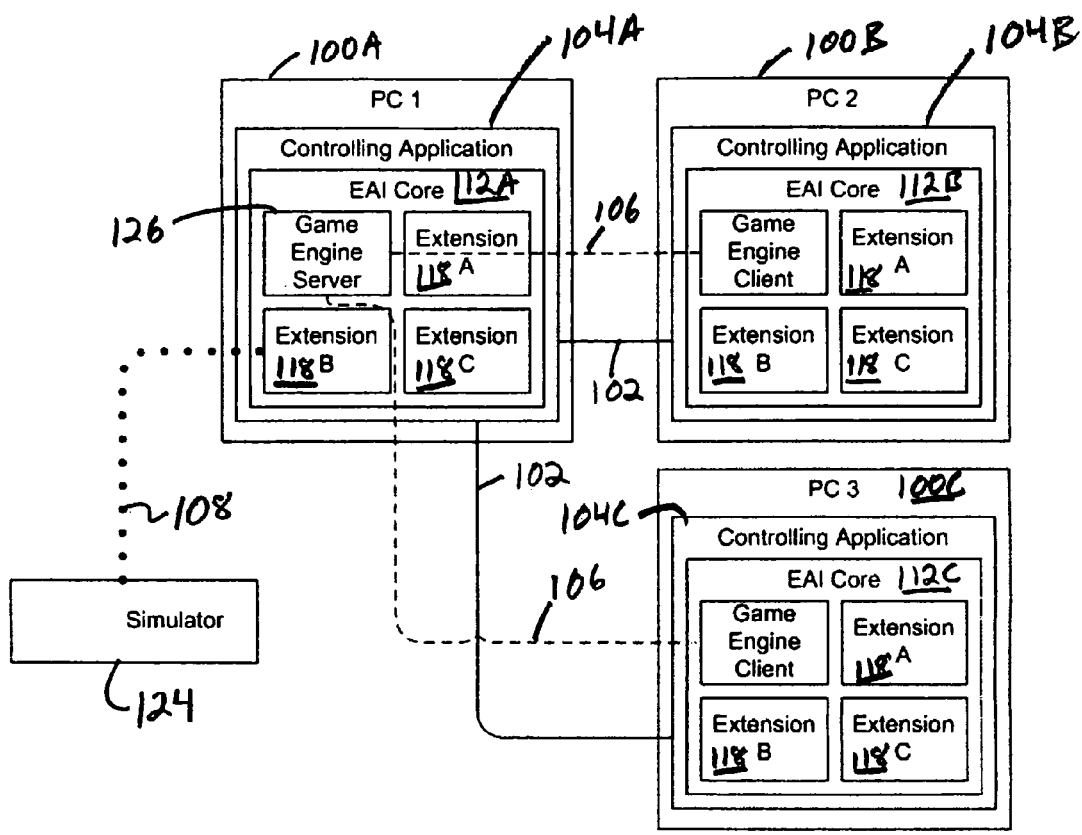
FIG. 4 is a block diagram of an exemplary hardware implementation of the preferred embodiment of the present invention.

FIG. 4 displays a basic EAI integrated system 100 with three personal computer (PC's) 100 running one Game Engine Server 126A and two Game Engine Clients 126B, and one Simulator 124. Communication link 102 (solid lines) represents the network communication between Controlling Applications 104 that uses EAI Core 112. Communication link 106 (dashed lines) represent the native network communication of Game Engine 126. Communication link 108 (dotted lines) connects Simulator 124 directly to an Extension 118B within EAI Core 112A of PC 1 100A. Simulator 124 may be any one of various simulation systems such as the VCCT, ONESAF, CCTT, and JCATS military training simulators. The PCs 100 are configured and built based on the current requirements for integrated Game Engine Server 126A. This varies based on the complexity and generation of Game Engine Server 126A. PC 2 100B and PC 3 100C are also Windows based machines. These machines 100B and 100C are running instances of EAI Core 12 which are running instances of Game Engine Clients 126B. Game Engine Server 126A is dedicated to centralizing all the information within the game engine environment, making it the authority on all game engine specific data. Game Engine Server 126A preferably has no visuals and is purely data driven. Game Engine Clients 126B have renderers and take user input from various devices. Game Engine Clients 126B rely on Game Engine Server 126A for most of their information.

FIG. 4 illustrates how the centralized Game Engine Server 126A aggregates all the needed data to translate to EAI Core 112A. For example, if Simulator 124 is an ONESAF simulator, in order for the ONESAF simulator to access all the data in the configuration it will need one central authority. That central authority is EAI Core 112A which is running Game Engine Server 126A. Since Game Engine Clients 126B rely on Game Engine Server 126A for most of their information, there is a lot of data that is not relevant to Game Engine Client 126B and therefore not propagated to them. Since EAI Core 112A has an instance of Game Engine Server 126A, it can easily translate all data within Game Engine 126. This in turn provides the information to the relevant Extensions 118 (ONESAF Extension in this case). If ONESAF were to create an object and it was propagated through the ONESAF Extension, then that object would be translated into an EAI Core Entity 28 or Interaction 30, this translation happens with EAI Core 112A that is running the ONESAF Extension and Game Engine Server 126A. Once Entities 28 and Interactions 30 are translated into Game Engine Server 126A, Game Engine Server 126A intrinsically propagates those objects through its native communication methods on communication links 102 with Game Engine Clients 126B.

The implementation depicted in FIG. 4 illustrates that EAI Core 12 can use an Extension 18 to communicate over the network to a specific Simulator 24. More Extensions 18 and Simulators 24 can be added to the configuration. EAI Core 12 itself does not communicate through any network channels; all communications of EAI Core 12 are direct API calls to and from Game Engine 26 and Controlling Application 104.

From the above description, it will be apparent that the invention disclosed herein provides a novel and advantageous engine agnostic interface. The foregoing discussion discloses and describes merely exemplary methods and embodiments of the present invention. One skilled in the art will readily recognize from such discussion that various changes, modifications and variations may be made therein without departing from the spirit and scope of the invention.

We claim:

1. A method for communicating between a simulator and a game engine, the method comprising steps of:
   providing an agnostic interface mechanism coupled between the simulator and the game engine;
   receiving a first simulator specific object from the simulator via a specific protocol of the simulator;
   translating the first simulator specific object into a first interface object;
   translating the first interface object into a game specific object and to transmit the first game specific object to the game engine; and
   providing a core control coupled for controlling the communication of objects between the simulator and the game engine;
   wherein the agnostic interface mechanism provides the first game specific object to the game engine through a direct application programming interface (API) call;
   generating a second game specific object at the game engine;
   translating the second game specific object generated by the game engine into a second interface object;
   translating the second interface object into a second simulator specific object in accordance with the simulator specific protocol; and
   providing the second simulator specific object to the simulator;
   wherein the first game specific object, the first interface object and the first simulator specific objects are corresponding data objects; and
   wherein the second game specific object, the second interface object and the second simulator specific objects are corresponding data objects;
   generating a third interface object in the core control; translating the third interface object into a third game specific object; and transmitting the third game specific object to the game engine; wherein the second game specific object is a control object.

2. The system recited in claim 1, wherein the core control generates the third interface object to manage multiple instances of the game engine.

3. The system recited in claim 1, wherein the third interface object is selected from the following group of control objects: creating the game engine, starting the game engine, stopping the game engine or destroying the game engine.

4. A communication system, the system comprising:
   a computer;
   a simulator;
   a game engine; and
   an agnostic interface mechanism coupled between the simulator and the game engine, the agnostic interface mechanism comprising:
   a first interface configured to receive a first simulator specific object from the simulator via a specific protocol of the simulator and to translate the first simulator specific object into a first interface object;
   a second interface configured to translate the first interface object into a game specific object and to transmit the first game specific object to the game engine; and
   a core control coupled between the first interface and the second interface for controlling the communication of objects between the simulator and the game engine; wherein the core control through the second interface provides the first game specific object to the game engine through a direct application programming interface (API) call;
   wherein the second interface is configured to translate a second game specific object generated by the game engine into a second interface object, and wherein the first interface is configured to translate the second interface object into a second simulator specific object in accordance with the simulator specific protocol and to provide the second simulator specific object to the simulator;
   wherein the first game specific object, the first interface object and the first simulator specific objects are corresponding data objects; and
   wherein the second game specific object, the second interface object and the second simulator specific objects are corresponding data objects;
   a third interface in the agnostic interface mechanism configured to translate a third interface object into a third game specific object and to transmit the third game specific object to the game engine; wherein the second game specific object is a control object.

5. The system recited in claim 4, wherein the core control generates the third interface object to manage multiple instances of the game engine.

6. The system recited in claim 4, wherein the third interface object is selected from the following group of control objects: creating the game engine, starting the game engine, stopping the game engine or destroying the game engine.

7. A computer program product comprising a non-transitional computer usable medium having control logic stored therein for interfacing between a simulator and a game engine, the control logic comprising:
   first computer readable program code means for causing the computer to receive a first simulator specific object from the simulator via a specific protocol of the simulator;

second computer readable program code means for causing the computer to translate the first simulator specific object into a first interface object;

third computer readable program code means for causing the computer to translate the first interface object into a game specific object and to transmit the first game specific object to the game engine;

fourth computer readable program code means for causing the computer to provide a core control coupled for controlling the communication of objects between the simulator and the game engine; and fifth computer readable program code means for causing the computer to provide the first game specific object to the game engine through a direct application programming interface (API) call;

sixth computer readable program code means for causing the computer to generate a second game specific object at the game engine;

seventh computer readable program code means for causing the computer to translate the second game specific object generated by the game engine into a second interface object;

seventh computer readable program code means for causing the computer to translate the second interface object into a second simulator specific object in accordance with the simulator specific protocol; and eighth computer readable program code means for causing the computer to provide the second simulator specific object to the simulator;

wherein the first game specific object, the first interface object and the first simulator specific objects are corresponding data objects; and wherein the second game specific object, the second interface object and the second simulator specific objects are corresponding data objects;

ninth computer readable program code means for causing the computer to generate a third interface object in the core control;

tenth computer readable program code means for causing the computer to translate the third interface object into a third game specific object; and eleventh computer readable program code means for causing the computer to transmit the third game specific object to the game engine;

wherein the second game specific object is a control object.

8. The computer program product recited in claim 7, wherein the ninth computer readable program code means generates the third interface object to manage multiple instances of the game engine.

9. The computer program product recited in claim 7, wherein the third interface object is selected from the following group of control objects: creating the game engine, starting the game engine, stopping the game engine or destroying the game engine.

* * * * *